US006502158B1

(12) United States Patent
James et al.

(10) Patent No.: US 6,502,158 B1
(45) Date of Patent: Dec. 31, 2002

(54) METHOD AND SYSTEM FOR ADDRESS SPACES

(75) Inventors: David V. James, Palo Alto, CA (US); Bruce Fairman, Woodside, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/531,084

(22) Filed: Mar. 18, 2000

Related U.S. Application Data

(60) Provisional application No. 60/130,698, filed on Apr. 23, 1999, provisional application No. 60/137,916, filed on Jun. 7, 1999, provisional application No. 60/144,101, filed on Jul. 16, 1999, provisional application No. 60/150,393, filed on Aug. 23, 1999, provisional application No. 60/155,305, filed on Sep. 21, 1999, and provisional application No. 60/158,722, filed on Oct. 11, 1999.

(51) Int. Cl.$^7$ .............................................. G06F 13/00
(52) U.S. Cl. ......................................... 710/311; 710/100
(58) Field of Search ................................. 710/100, 300, 710/104, 305, 306, 311

(56) References Cited

U.S. PATENT DOCUMENTS

| | | | |
|---|---|---|---|
| 4,538,259 A | 8/1985 | Moore ........................ 370/60 |
| 4,935,894 A | 6/1990 | Ternes et al. | |
| 5,381,138 A | 1/1995 | Stair et al. ............ 340/825.44 |
| 5,402,416 A | 3/1995 | Cieslak et al. ................ 370/60 |
| 5,485,505 A | 1/1996 | Norman et al. ............... 379/58 |
| 5,511,165 A | 4/1996 | Brady et al. | |
| 5,603,084 A | 2/1997 | Henry, Jr. et al. ......... 455/33.1 |
| 5,623,483 A | 4/1997 | Agrawal et al. ............ 370/253 |
| 5,684,796 A | 11/1997 | Abidi et al. ................ 370/389 |
| 5,684,959 A | 11/1997 | Bhat et al. ............. 395/200.11 |
| 5,689,499 A | 11/1997 | Hullett et al. ............... 370/235 |
| 5,724,517 A | 3/1998 | Cook et al. ............ 395/200.57 |
| 5,734,824 A | 3/1998 | Choi ...................... 395/200.11 |
| 5,751,967 A | 5/1998 | Raab et al. ............ 395/200.58 |
| 5,757,772 A | 5/1998 | Thornberg et al. .......... 370/236 |
| 5,764,930 A | 6/1998 | Staats ......................... 710/107 |
| 5,774,683 A | 6/1998 | Gulick | |
| 5,790,530 A | 8/1998 | Moh et al. .................... 370/363 |
| 5,790,815 A | 8/1998 | Swanstrom et al. ........ 395/309 |
| 5,812,774 A | 9/1998 | Kempf et al. .......... 395/200.42 |
| 5,825,752 A | 10/1998 | Fujimori et al. ............. 370/260 |
| 5,832,245 A | 11/1998 | Gulick | |
| 5,842,124 A | 11/1998 | Kenagy et al. .............. 455/418 |
| 5,848,266 A | 12/1998 | Scheurich ................... 395/558 |
| 5,854,910 A | 12/1998 | Gulick | |
| 5,870,387 A | 2/1999 | Mulla ......................... 370/258 |
| 5,872,524 A | 2/1999 | Iida ....................... 340/825.52 |
| 5,872,944 A | 2/1999 | Goldrian et al. ............ 395/306 |

(List continued on next page.)

OTHER PUBLICATIONS

Hoffman, et al., Compcon '95, IEEE 1394: *A Ubiquitous Bus*, pp. 1–9, (visited Jan. 20, 2000) Mar. 5 to 9, 1995 <http://www.skipstone.com/compcon.html>.

Jennings, R., IEEE 1934 High Performance Serial Bus, *Fire on Wire*, pp. 1–18, (last modified Apr. 8, 1999) <http://www.chumpchange.com/parkplace/video/dvpapers/firewire.htm>.

*Primary Examiner*—Xuan M. Thai
(74) *Attorney, Agent, or Firm*—Blakely Sokoloff Taylor & Zafman LLP

(57) ABSTRACT

A system for allowing a node to be accessed through multiple address spaces. The system includes a virtual address memory providing a software settable bus identification address and a stable node identification address for each node in a net, a physical address memory providing a physically assigned node identification address for each node in a local bus, and a logical address memory providing a stable node identification address for each node in the local bus.

21 Claims, 10 Drawing Sheets

U.S. PATENT DOCUMENTS

| | | |
|---|---|---|
| 5,875,301 A | 2/1999 | Duckwall et al. ...... 395/200.51 |
| 5,883,621 A | 3/1999 | Iwamura ..................... 345/327 |
| 5,892,929 A | 4/1999 | Welker ....................... 710/107 |
| 5,901,332 A | 5/1999 | Gephardt et al. ........... 395/861 |
| 5,905,732 A | 5/1999 | Fimoff et al. ............... 370/516 |
| 5,910,178 A | 6/1999 | Moh et al. ................... 709/232 |
| 5,920,267 A | 7/1999 | Tattersall et al. ....... 340/825.05 |
| 5,923,673 A | 7/1999 | Henrikson |
| 5,930,703 A | 7/1999 | Cairns ........................ 455/418 |
| 5,935,208 A | 8/1999 | Duckwall et al. ........... 709/221 |
| 5,941,964 A | 8/1999 | Young et al. |
| 5,961,623 A | 10/1999 | James et al. ................ 710/113 |
| 5,970,234 A | 10/1999 | Jin |
| 5,974,036 A | 10/1999 | Acharya et al. ............ 370/331 |
| 5,978,854 A | 11/1999 | Fujimori ..................... 709/245 |
| 5,991,520 A | 11/1999 | Smyers et al. .............. 395/280 |
| 6,005,852 A | 12/1999 | Kokko et al. ............... 370/329 |
| 6,023,732 A | 2/2000 | Moh et al. ................... 709/232 |
| 6,032,211 A | 2/2000 | Hewitt ........................ 710/107 |
| 6,038,625 A | 3/2000 | Ogino et al. ................. 710/104 |
| 6,055,561 A | 4/2000 | Feldman et al. ............. 709/200 |
| 6,072,772 A | 6/2000 | Charny et al. .............. 370/229 |
| 6,085,270 A | 7/2000 | Gulick ........................ 710/100 |
| 6,104,706 A | 8/2000 | Richter et al. .............. 370/263 |
| 6,108,718 A | 8/2000 | Fujimori et al. ................ 710/9 |
| 6,119,243 A | 9/2000 | Garney et al. ............... 713/600 |
| 6,131,119 A | 10/2000 | Fukui .......................... 709/224 |
| 6,137,777 A | 10/2000 | Vaid et al. ................... 370/230 |
| 6,138,178 A | 10/2000 | Watanabe ....................... 710/8 |
| 6,138,196 A | 10/2000 | Takayama et al. .......... 710/105 |
| 6,141,767 A | 10/2000 | Hu et al. ......................... 714/1 |
| 6,151,651 A | 11/2000 | Hewitt et al. ............... 710/129 |
| 6,185,632 B1 | 2/2001 | Berkema ..................... 710/20 |
| 6,192,428 B1 | 2/2001 | Abramson et al. ............ 710/52 |

METHOD AND SYSTEM FOR ADDRESS SPACES

This application claims benefit of U.S. Provisional Application No. 60/130,698 filed Apr. 23, 1999 as well as U.S. Provisional Application No. 60/137,916 filed Jun. 7, 1999, U.S. Provisional Application No. 60/144,101 filed Jul. 16, 1999, U.S. Provisional Application No. 60/150,393 filed Aug. 23, 1999, U.S. Provisional Application No. 60/155,305 filed Sep. 21, 1999 and U.S. Provisional Application No. 60/158,722 filed Oct. 11, 1999.

FIELD OF THE INVENTION

The present invention relates generally to audio, video, audio/video interconnected systems for home and office use. More particularly, the present invention relates to address spaces on bus bridges.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge" and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394-1995, *Standard For A High Performance Serial Bus*, Aug. 30, 1996 (hereinafter "IEEE 1394 standard") and related other 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without demonstrating performance of the bus, except when traffic crosses the bus bridge to reach the desired destination on the other bus. To perform this function, the bridge is configured to understand and participate in the bus protocol of each of the buses.

Multi-bus systems are known to handle the large amounts of information being utilized. However, communication between buses and devices on different buses is difficult. Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to the intermediate system backbone bus which also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed; bus initialization, tree identification, and self identification. Within the IEEE 1394 standard, a single node must first be established as the root node during the tree identification process in order for the reconfiguration to occur.

Some bus bridges lack a stable node identification system. This could result in the wrong node being accessed if the node identifications are changed, which could lead to system corruption.

SUMMARY OF THE INVENTION

A system for allowing a node to be accessed through multiple address spaces. The system includes a virtual address memory providing a software settable bus identification address and a stable node identification address for each node in a net, a physical address memory providing a physically assigned node identification address for each node in a local bus, and a logical address memory providing a stable node identification address for each node in the local bus.

BRIEF DESCRIPTION OF THE DRAWINGS

Features and advantages of the prevention invention will be apparent to one skilled in the art in light of the following detailed description in which.

DETAILED DESCRIPTION

A bus bridge including a memory for storing node addresses is described. The node addresses include a stable node identification address to allow access to nodes after addition or removal of nodes.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
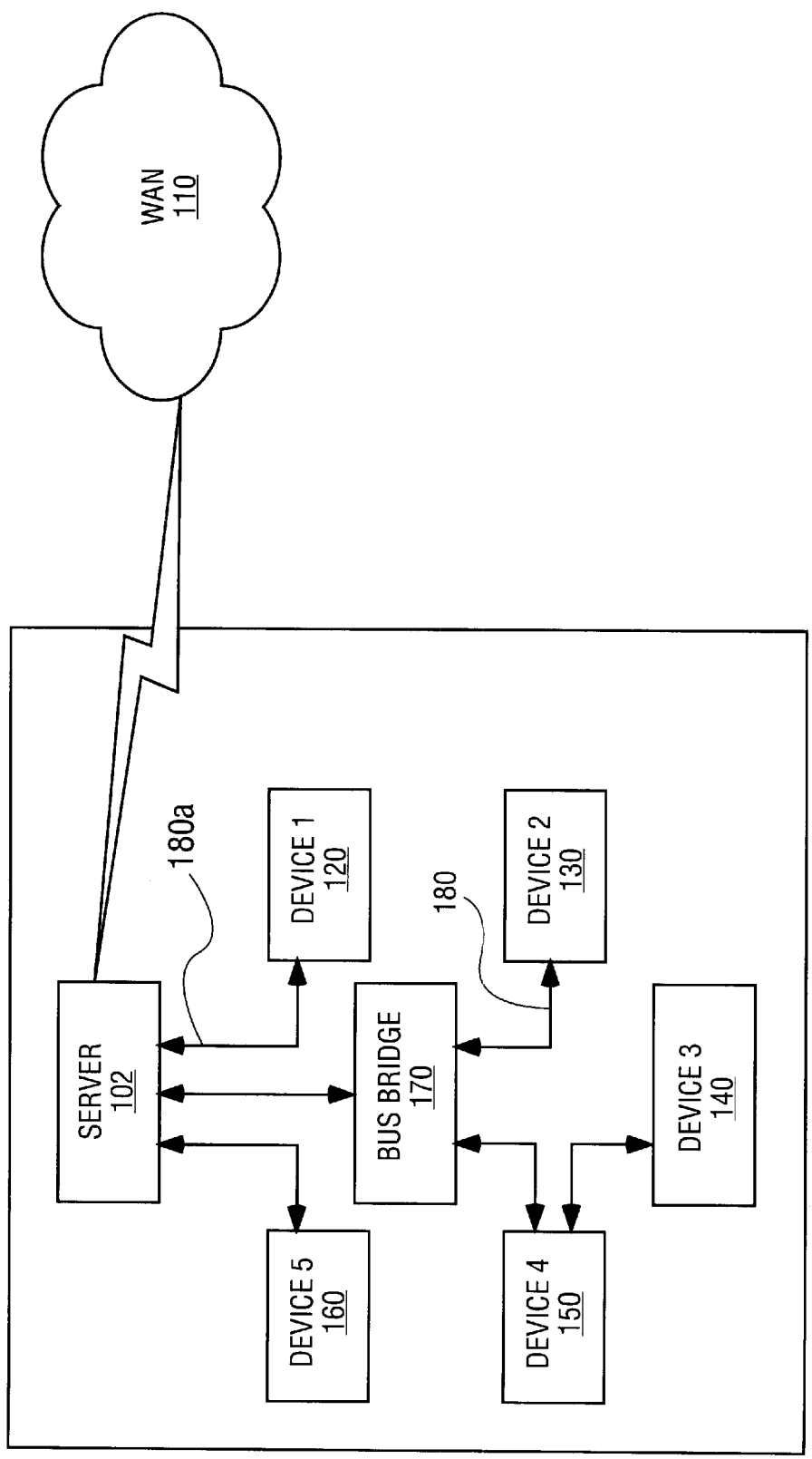
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
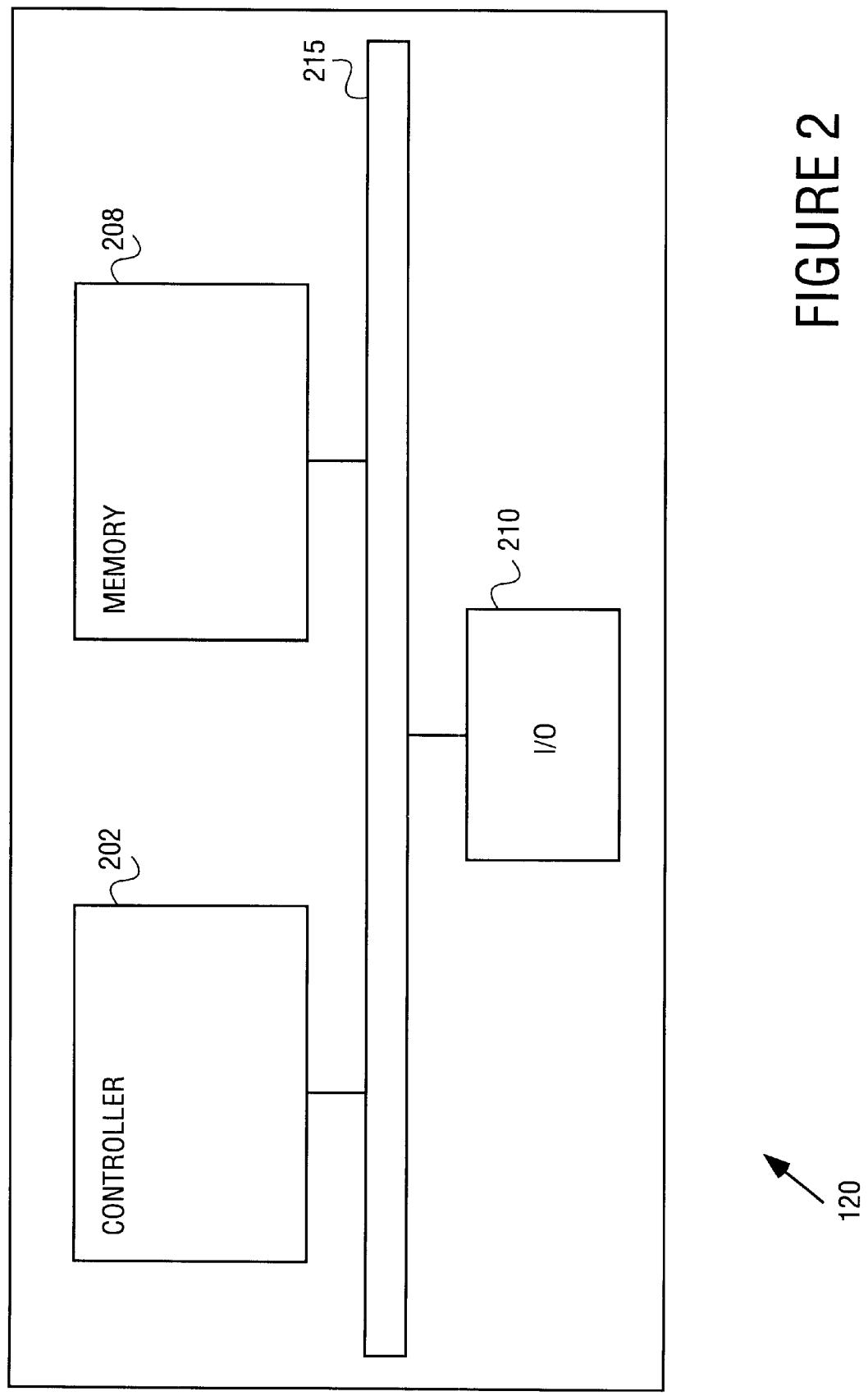
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–161) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
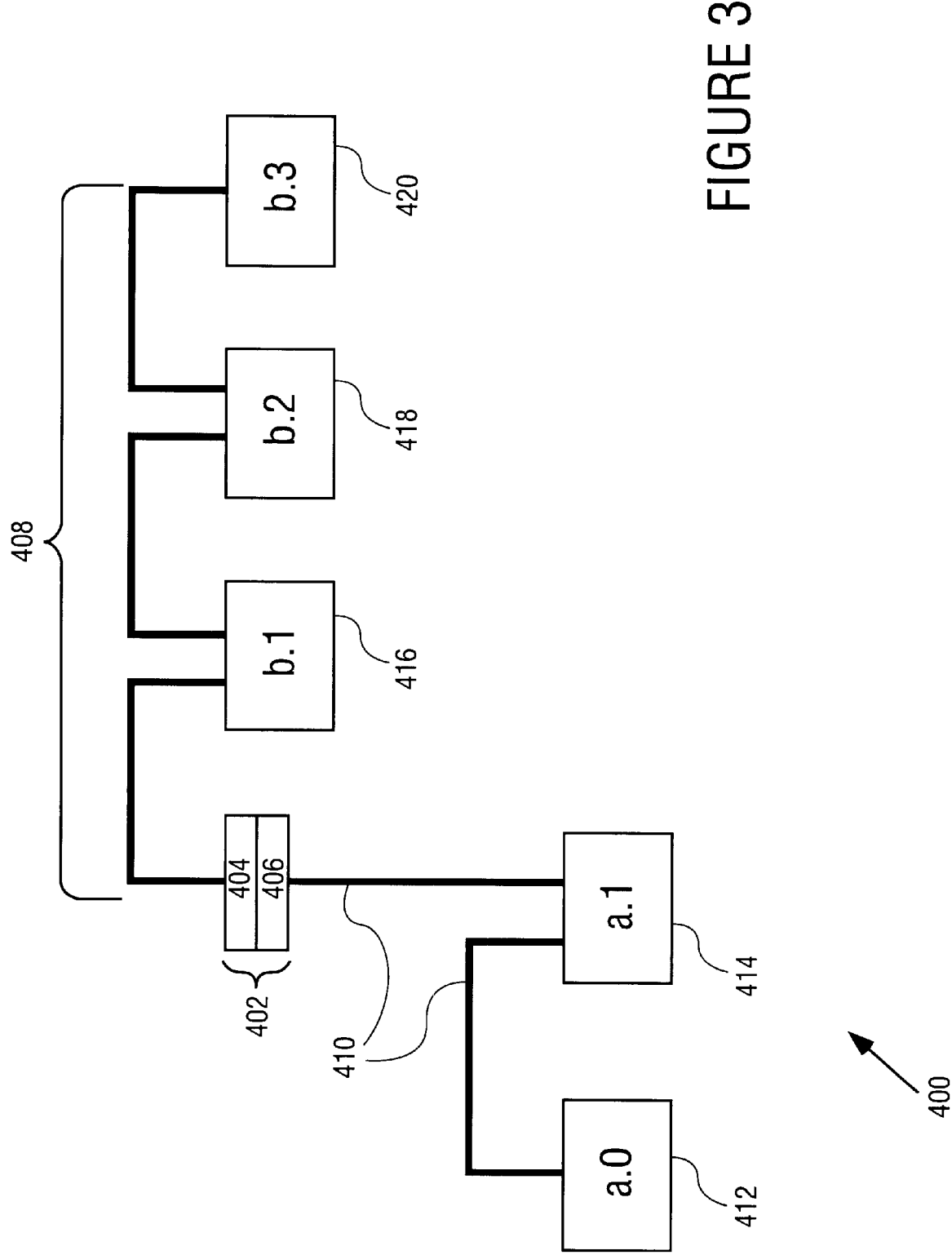
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices 310 on a bus 263 and supports multiple bus systems via bus bridge 402.

The control and status register (CSR) architecture, ISO/IEC 13213 (ANSI/IEEE 1212), *Information systems-Control and Status Registers (CSR) Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
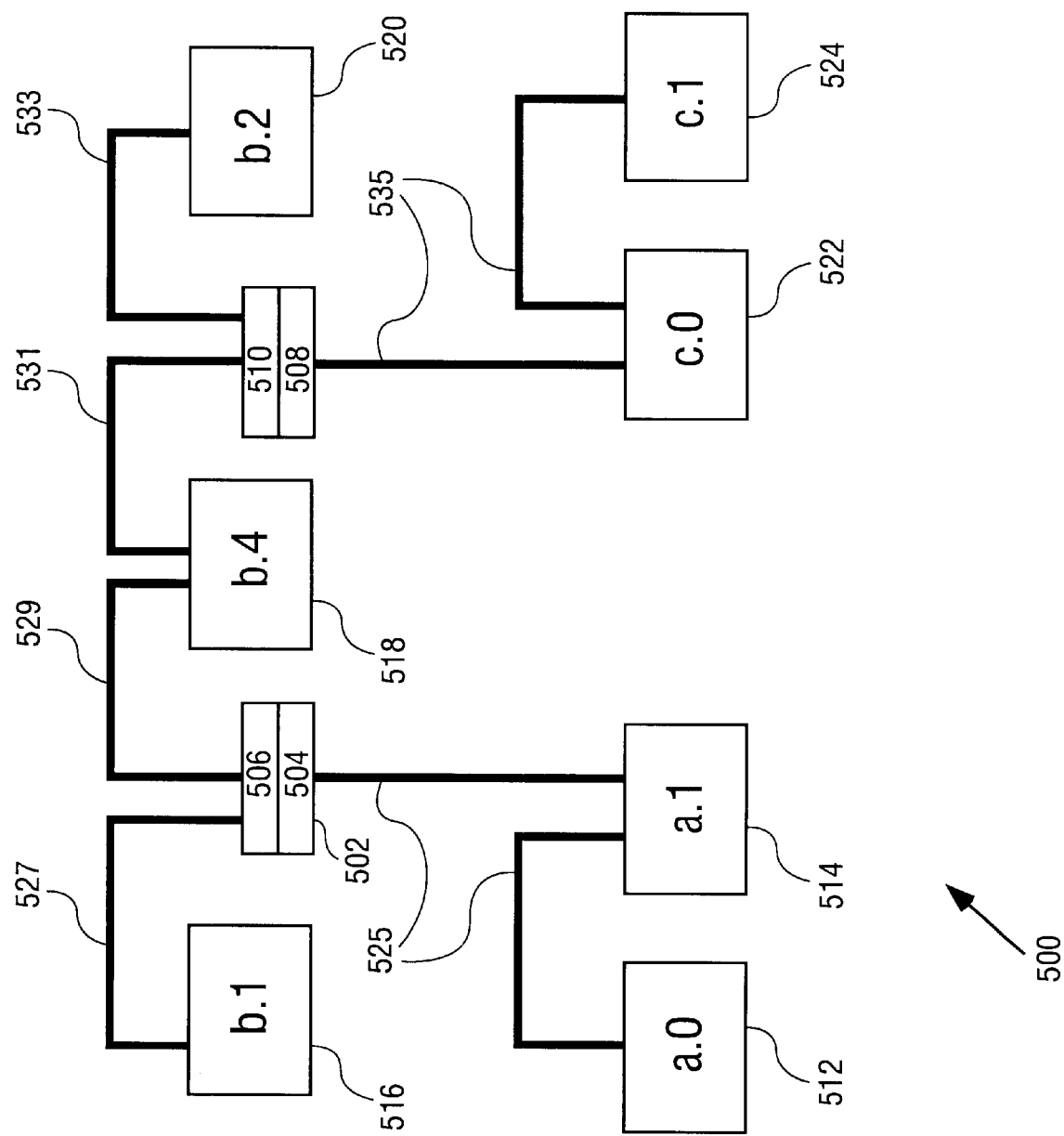
FIG. 4 is a block diagram of one embodiment for a 1394 bus bridge topology.
Figure 5:
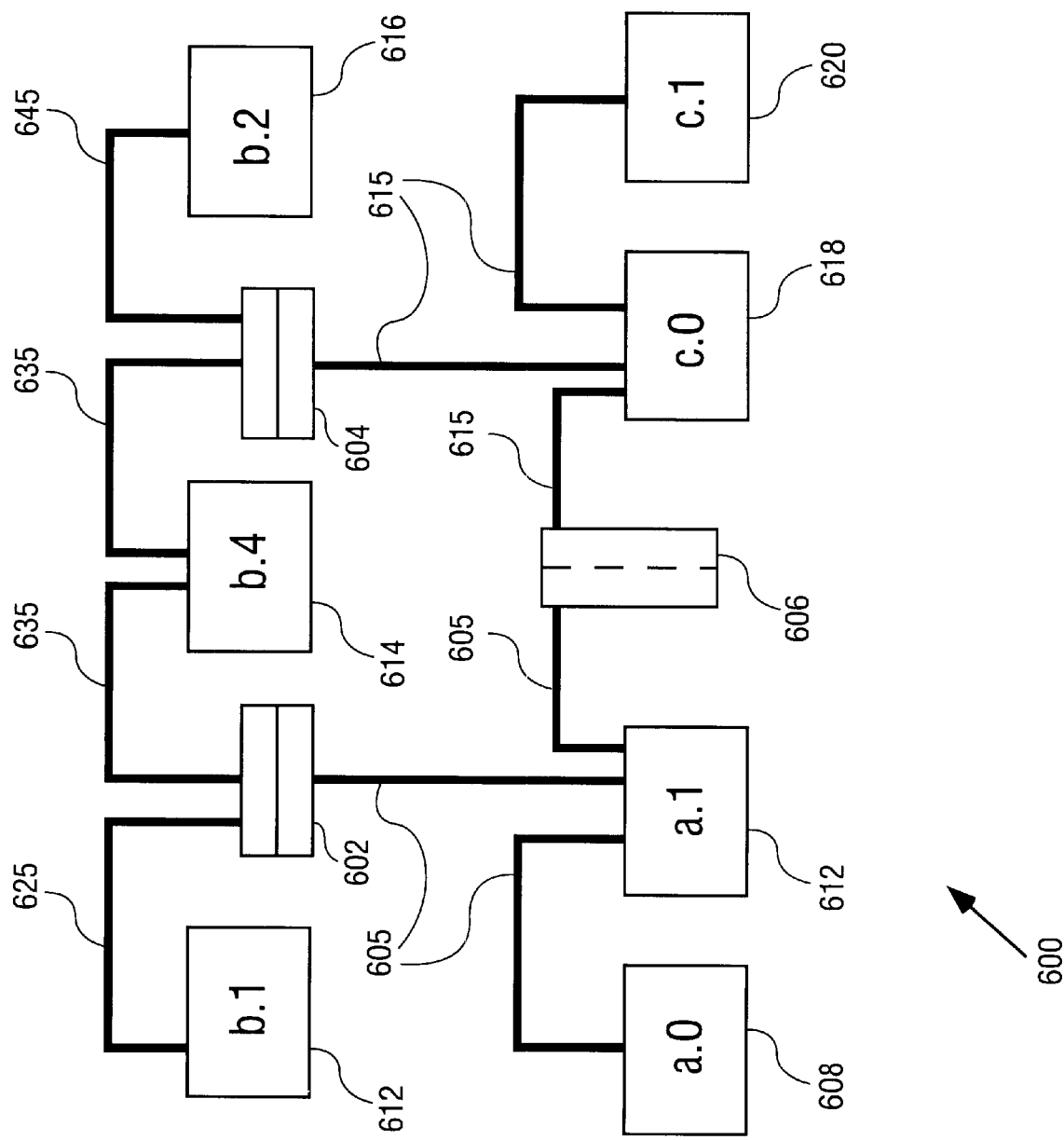
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506, 508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest refresh ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506, 508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

One of the portals, which could be the primary portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. Bus bridges communicate between themselves, in what is called a net refresh operation, to determine the set of unique busIDs that are assigned to each bus. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. Referring to FIG. 5, during node 300 addition, portal 606 may be added to the topology 600 forming a loop. Thus, a path exists from a0–b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
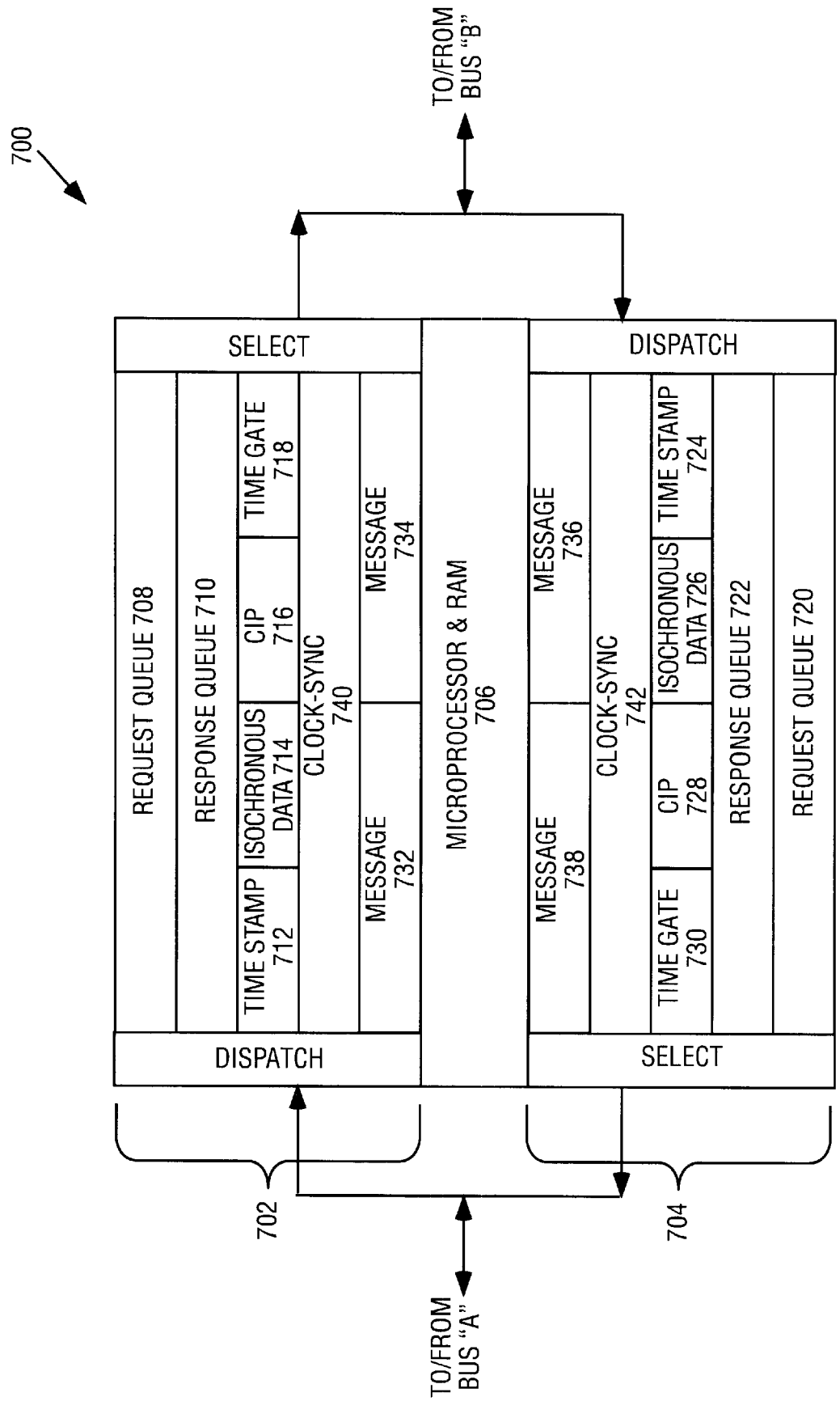
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

The Serial Bus uses a 64-bit addressing architecture. The most-significant 16 bits (nodeID) of the 64 bits specifies a target-node (as discussed above). The least significant 48 bits (offset address) specifies a location within that node (i.e. selects what resource to access within a node). The nodeID has two components: a) the first 10 bits, or busID, is used to identify the bus, and b) the remaining 6 bits (localID) is used to identify the device on the bus. Whenever a node is attached or detached, all the other nodes may change. There are 64 devices on each bus and 1024 buses in a system. Thus, address spaces are a linear way of corresponding to these addresses in a bus bridge, as illustrated in FIG. 7.

Figure 7:
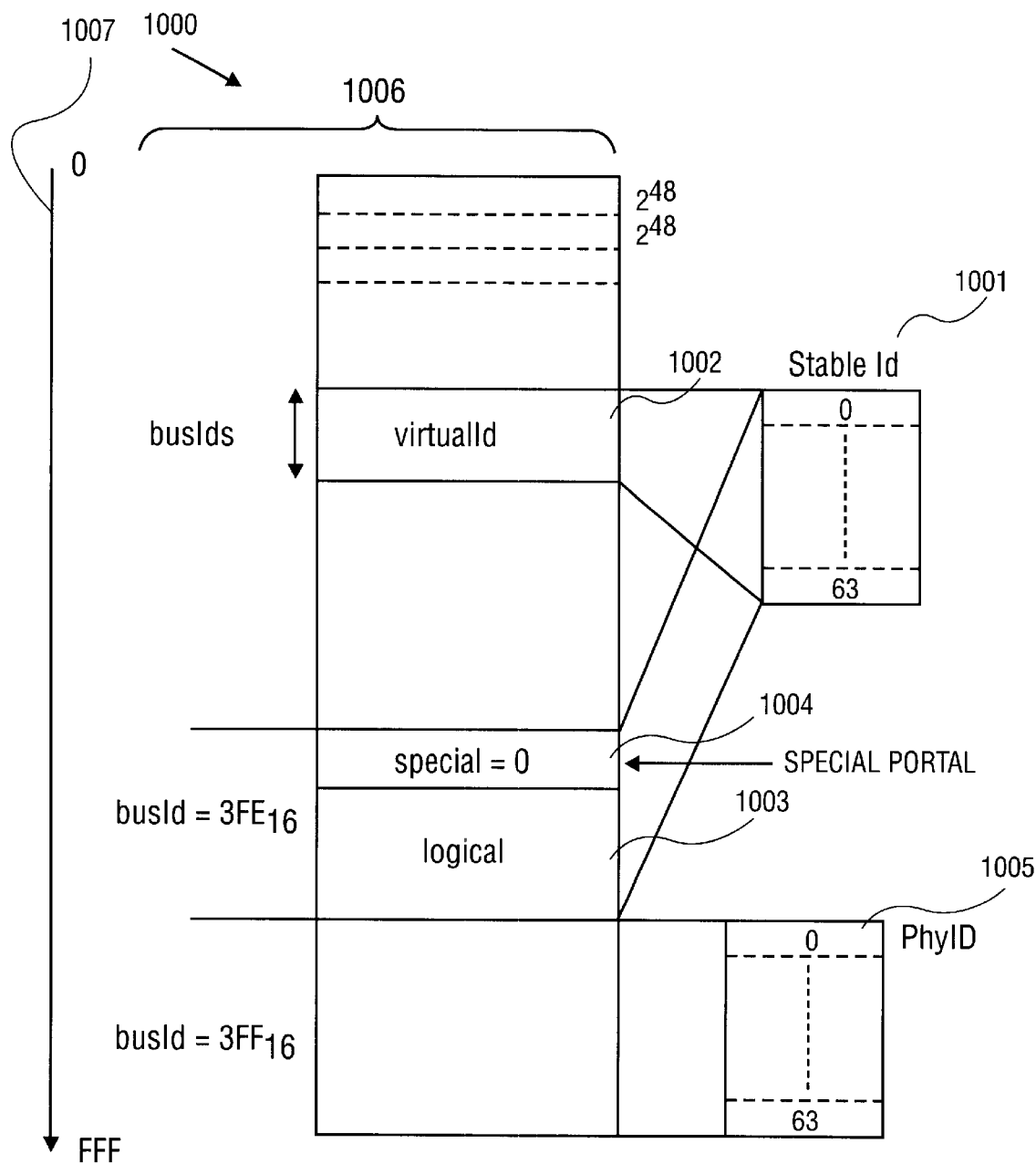
FIG. 7 is a block diagram of one embodiment for a bus bridge address space.

FIG. 7 is a block diagram of one embodiment for a bus bridge address space 1000. Referring to FIG. 7, bus bridge addresses for each node include three node identification (nodeID) address spaces: a physical identification address space (phyID) 1005, a logical identification address space (logicalID) 1003, and a virtual identification address space (virtualID) 1002. In one embodiment, the bus numbers associated with these spaces are $3FF_{16}$, $3FE_{16}$, and net refresh assigned, respectively. BusIDs 1007 range from 0 to $3FF_{16}$. Each busID 1006 contains 64 localID addresses, as shown for virtualID 1002.

All nodes reside in physical address space 1005. PhyIDs 1005 are localIDs which are dependent on their cable topology. Local bus nodes are accessed by the bus bridge through their cable topology dependent localID as phyID address assignments.

In one embodiment, a virtual nodeID 1002 may include a software settable busID 1006 and stableID 1001. The busID addresses are assigned during each net refresh providing each bus with a distinct range of 64 stableID addresses 1001. This allows each node to respond to a net-unique semi-stable virtualID address 1002.

In one embodiment, the bridge portals maintain the mapping between stableID 1001 and phyID 1005 addresses. In the case of a same-bus transfer, the request is captured by the delta portal, which translates between stableID 1001 and phyID addresses 1005.

In an alternate embodiment, the bus bridge portals could write the assigned stableID 1001 into a register on each node. Thus, the node has a register that is either updated by a bus bridge portal or retains its last written value unless a conflict is detected. In another embodiment, during a bus reset the stableID values 1001 are determined by the nodes in a cooperative fashion.

Figure 8A:
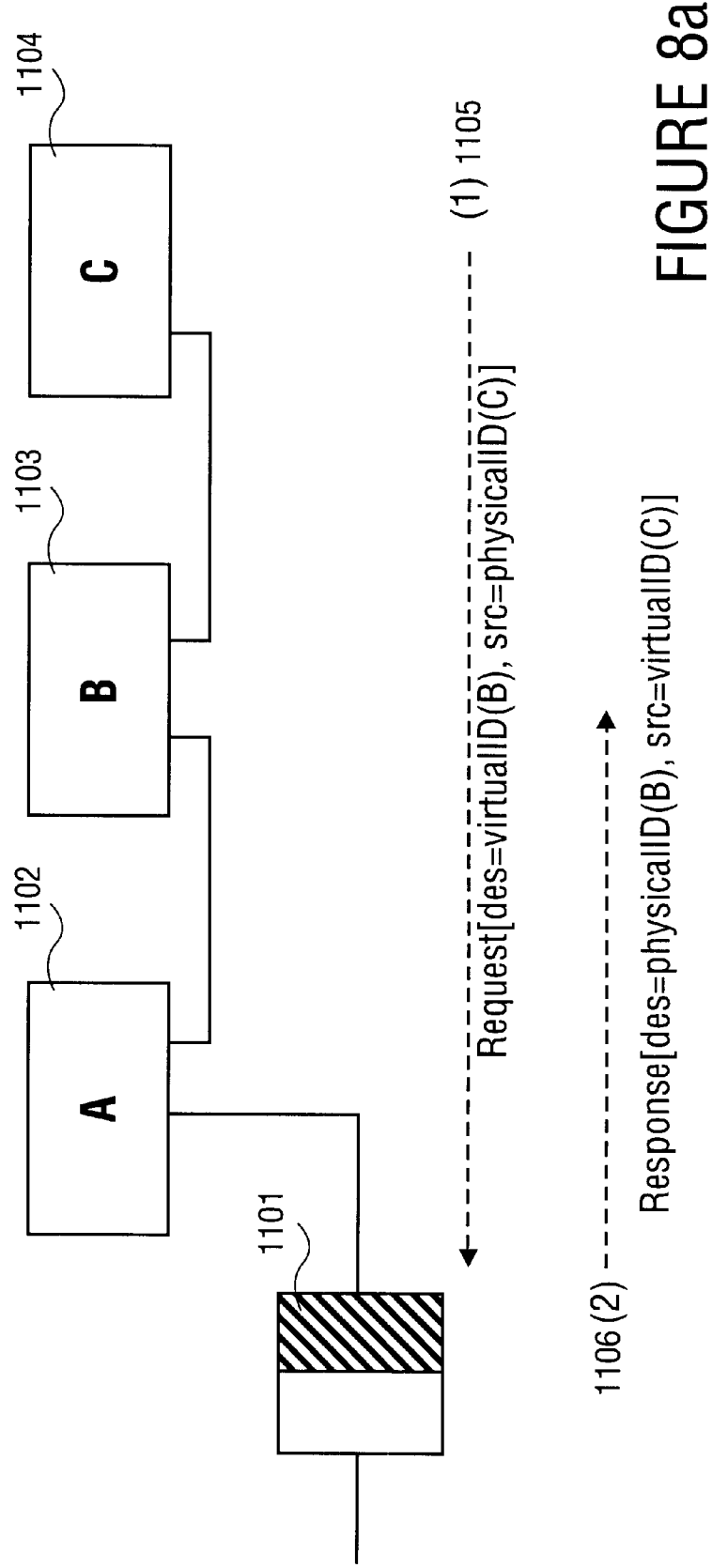
FIGS. 8a-b are block diagrams of one embodiment for the translation between physical and virtual addresses within a bus bridge.
Figure 8B:
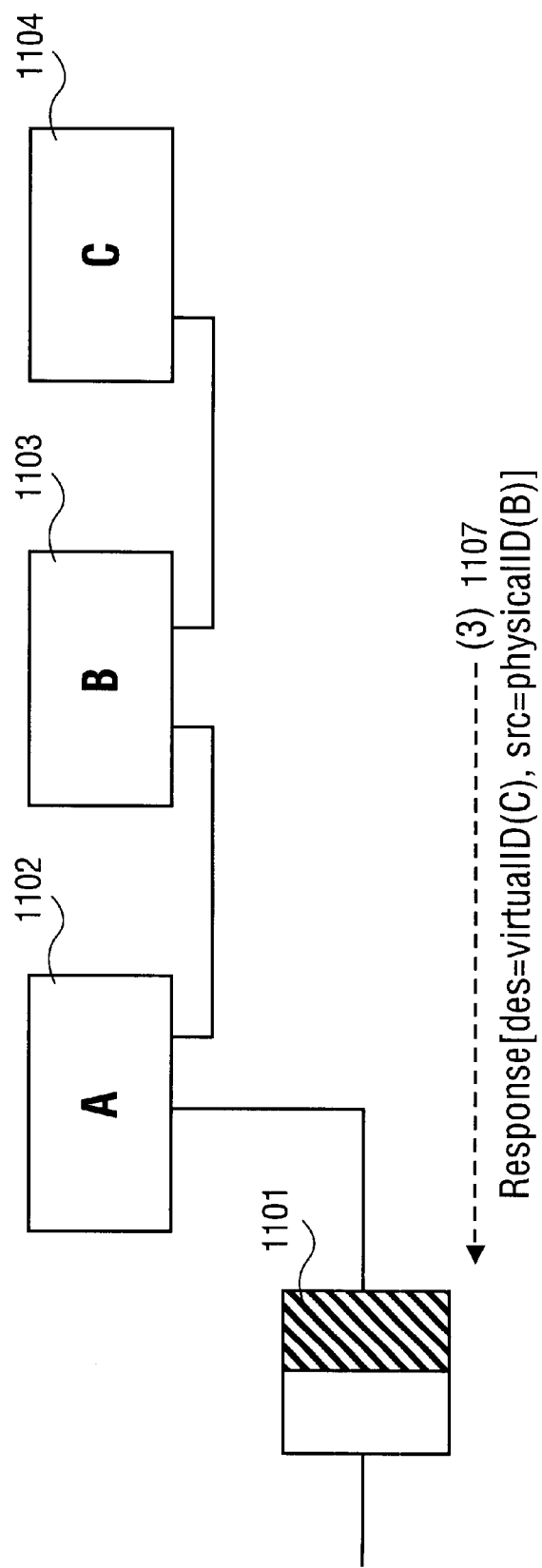

FIGS. 8a and 8b are block diagrams of one embodiment for virtual to phyID 1005 translation by a bridge portal 1101, which is a delta portal in the embodiment shown. The delta portal may be any portal on the bus, but there may only be one delta portal on the bus. In one embodiment, the delta portal 1101 is the portal on a bus having the lowest phyID 1005 and manages the stableIDs 1001 on a bus. The stableID 1001 may be a part of the virtualID 1002 or the logicalID 1003. In an alternate embodiment, the delta portal may be the portal on the path back toward the prime portal or the alpha portal. Thus, the delta portal may be chosen locally or the delta portal may be the alpha portal or any other appropriate portal.

In the operation of FIGS. 8a and 8b, the delta portal 1101 captures a request having a local bus destination node and translates the destination identification address from the destination node's stableID 1001 to the destination node's phyID 1005 and sends the request to the destination node using the destination node's phyID 1005. The delta portal 1101 also translates the source node's phyID 1005, which is found in the request, to the source node's stableID 1001. The delta portal 1101 also performs stableID 1001 to phyID 1005 translation for the destination node of the response and phyID 1005 to stableID 1001 translation for the source node of the response. The source node of the request (which is the destination node of the response), in this case node C, may then store the phyID 1005 of the destination node of the request, in this case node B, which may be found in the response. The phyID 1005 of the destination node of the request may be stored in a cache memory in the source node for later use. The use of the phyID 1005 later by the source node may further increase efficiency of bus bridge operation.

In FIG. 8a, node C 1104 sends a request 1105 designated for node B 1103. The request is addressed to the stableID 1001 of node B 1103 from the phyID 1005 of node C 1104. Delta portal 1101 captures and translates the destination_ID from the stableID 1001 of node B 1103 to the phyID 1005 of node B and transmits the address translated request 1106, having as a source the stableID 1001 of node C 1104.

In FIG. 8b, node B 1103 then sends a response 1107 to the stableID 1001 of node C 1104. The delta portal 1101 captures the response and translates the addresses from the stableID 1001 of node C 1104 to the phyID 1005 of node C 1104 and from the phyID 1005 of node B 1103 to the stableID 1001 of node B 1103. The delta portal then transmits the address translated response 1108.

The requester, or node C 1104, may then store the stable-to-phyID address translation for node B 1103 in a cache memory (not shown), which can be extracted from the returned response. These cache entries allow the same bus nodes to efficiently access their neighbors, until the next bus reset (which causes these entries to be discarded).

Thus, the same addresses may be used to access node B 1103, for example, whether the requester is on the same bus or a remote bus. Although any portal node has the capability of performing these address translations, allocating this task to the primary portal eliminates the need to define contention resolution protocols.

Figure 9:
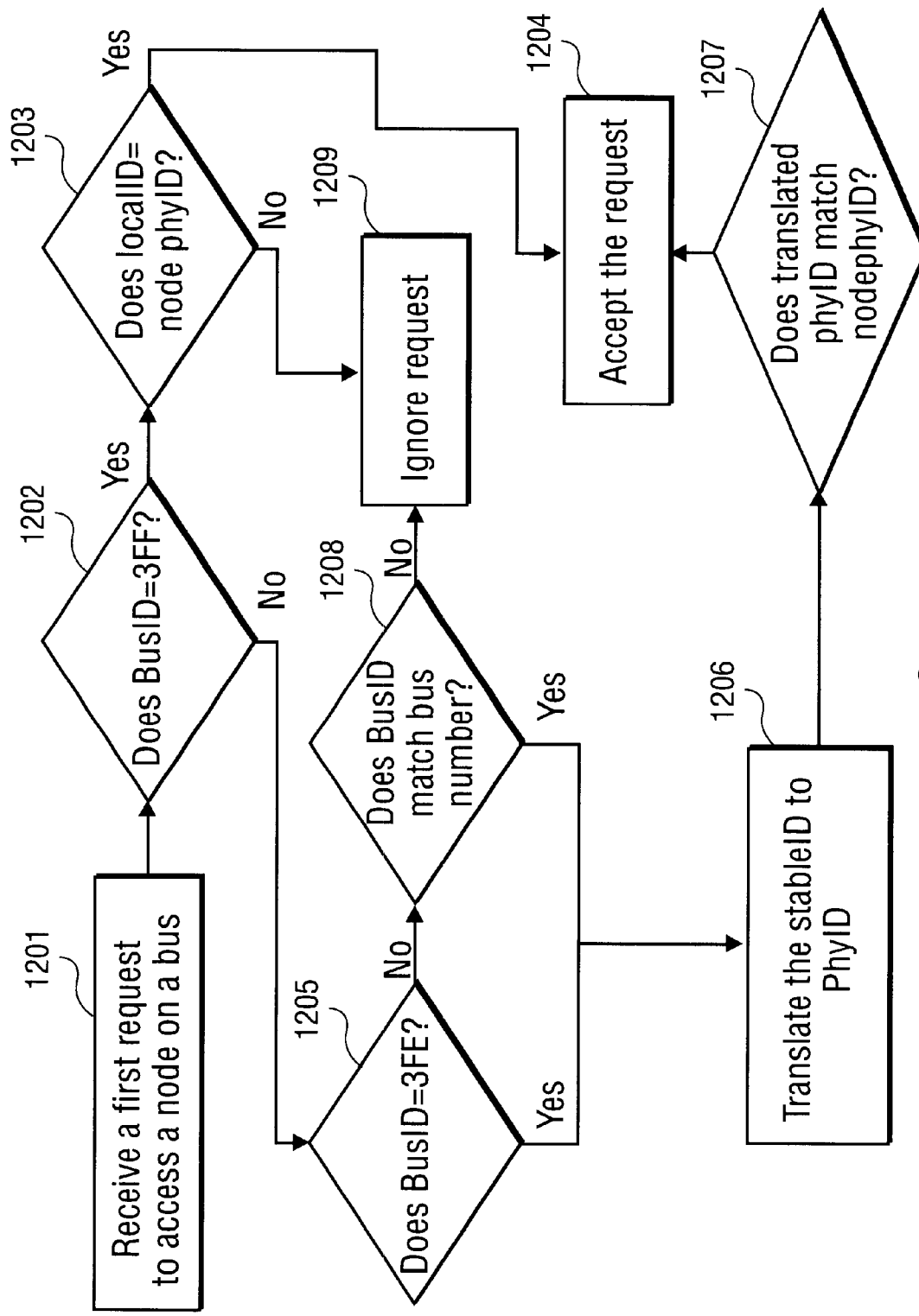
FIG. 9 is a flow diagram of request management in one embodiment of a bus.

FIG. 9 is a flow diagram of request management in one embodiment of a bus. At processing block 1201, a request to access a node on the bus is received. At processing block 1202, the busID 1007 address of the destination address is checked to see if it equals $3FF_{16}$. This checking may be done at a bus bridge on the bus or at the destination node. If the busID 1007 equals $3FF_{16}$, the localID portion of the destination address is compared to phyID 1005 addresses existing on the bus at processing block 1203. If the localID equals a phyID 1005 of a node on the bus, the node at the localID address of the destination address accepts the request at processing block 1204.

If the busID 1007 portion of the destination address does not equal $3FF_{16}$, at processing block 1205, the busID 1007 is checked to see if it equals $3FE_{16}$, or the logical busID 1007 of the local bus. If the busID 1007 address matches $3FE_{16}$, the localID portion of the destination address, the stableID, is translated to the phyID 1005 of the local bus, at processing block 1206. Then the translated phyID 1005 is compared to node phyIDs 1005 of the local bus at processing block 1207. If the translated phyID 1005 matches a node phyID 1005, the node at the phyID 1005 address accepts the request at processing block 1204.

If the busID 1007 portion of the destination address does not match the logical busID 1007, the busID 1007 is compared to the bus number of the bus at processing block 1208. At processing block 1206, if the busID 1007 matches the bus number, the localID portion of the destination address (the stableID) is translated to phyID 1005, as described above, since the destination address is the virtual address of the node. Then, at processing block 1207, the translated phyID 1005 is compared to node phyIDs 1005 of the local bus, as described above. If the translated phyID 1005 matches a node phyID 1005, the node at the phyID 1005 address accepts the request at processing block 1204.

If the localID does not match the phyID 1005 at processing block 1203 or if the busID 1007 does not match the bus number at processing block 1208, the request is ignored by the bus.

The processes described with respect to FIG. 9 may be performed by a bus bridge or a node or both, with a bus bridge performing some of the processes and a node performing the others.

Referring to the logical address space 1003 of FIG. 7, only local bus nodes can be accessed using the logicalID 1003. The local bus nodes may be accessed using their localID which uses their stableID 1001 address assignment. The stableID 1001 may be, according to one embodiment, the phyID 1005 the first time it is accessed. Since the busID 1007 portion of the logicalID 1003 is fixed, the logicalID 1003 is a more stable way to access local nodes than the virtualID 1001, whose busID can change.

Logical address to physical address translations follow the operation of the virtualID 1001-to-phyID 1005 address translations described by FIGS. 8*a* and 8*b*.

There are 64 possible busID 1001 addresses on each logically or virtually accessed bus, since a broadcast localID is not supported in either of these spaces.

With regard to FIG. 5, for example, if a device 516 is accessed by another bus, such as bus a 525, bus bridge 502 would be aware of the busID 1007 of bus 527. If the incoming address matched the busID 1007 of bus 527, bus bridge 502 would convert the busID 1007 to $3FF_{16}$ and send it out as a physical address of device 516. Without the logicalID 1003, a local portal would be accessed through the phyID 1005, and a portal on the general bus would be accessed through the virtualID 1001.

By partitioning the nodeIDs into bus-sized chunks, only 64 node addresses need be probed by enumeration software instead of 64,000. Like the physical space, the logical space is a way of checking local addresses first to lower the number of comparisons that need to be performed. Further, special nodes, such as a primary, alpha or delta portal 1101, may be assigned to well known logical addresses such as 0 or 63. In FIG. 7, the special portal 1004, is assigned the logical nodeID of 0 so that it may be found more quickly. The existence of the special portal at a known logicalID address1003 simplifies other nodes by allowing them to easily determine how to communicate with the special portal. If the busID 1001 of 0 is always assigned to the special portal, it is possible to find what buses exist by communicating with the special portal, and determine what buses exist on the local bus by checking the 64 nodes. Thus, all the buses in the system may be found by checking for them at the special portal. Time is saved by not having to probe each of the local nodes to determine which is the special portal.

The specific arrangements and methods herein are merely illustrative of the principles of this invention. Numerous modifications in form and detail may be made by those skilled in the art without departing from the true spirit and scope of the invention.

What is claimed is:

1. A system for allowing a node to be accessed through multiple address spaces comprising:
    a virtual address memory providing a net refresh managed bus identification address and a stable node identification address for each node in a net;
    a physical address memory providing a physically assigned node identification address for each node in a local bus; and
    a logical address memory providing a stable node identification address for each node in the local bus.

2. The system of claim 1 wherein the system translates stable node identification addresses to physical node identification addresses to allow access to local nodes using logical addresses.

3. The system of claim 1 wherein the system captures requests and translates logical node identification addresses to physical node identification addresses.

4. The system of claim 1 wherein the system captures responses and translates logical node identification addresses to physical node identification addresses.

5. The system of claim 1 wherein the stable node identification address is a initially assigned node identification address.

6. The system of claim 1 wherein a special portal on a bus is always assigned a fixed stable identification address.

7. The system of claim 6 wherein the special portal is the alpha portal.

8. The system of claim 6 wherein the special portal is the delta portal that does stable identification address to physical identification address translations.

9. The system of claim 1 wherein fixed stable identification addresses are assigned to nodes of interest.

10. The system of claim 1 wherein the stable identification addresses are assigned by a bus bridge.

11. The system of claim 1 wherein the stable identification addresses are recognized by a bus bridge and stored in a register on each node of a bus.

12. The system of claim 1 wherein the stable identification addresses are determined by local bus nodes in a cooperative fashion.

13. A system comprising:
    a bus including at least two nodes; and
    at least one bus bridge portal comprising
        a virtual address space for storing a software settable bus identification address and a stable node identification address for each node in a bus system;
        a physical address space for storing a physically assigned node identification address for each node in a local bus; and
        a logical address space for storing a stable node identification address for each node in the local bus.

14. The system of claim 13 wherein a portal captures node access requests from a requesting node and translates stable node identification addresses to physical node identification addresses.

15. The system of claim 13 wherein the requesting node stores the stable node identification address to physical node identification address translation in a cache memory in the requesting node.

16. The system of claim 13 wherein the bus is substantially similar to a version of the IEEE 1394 standard serial bus.

17. A bus bridge comprising:
    means for accessing nodes through software settable bus identification addresses and stable node identification addresses;
    means for accessing nodes through physical node identification addresses on a local bus; and
    means for accessing nodes through stable node identification addresses on a local bus.

18. A method for identifying nodes on a bus comprising:
    receiving a request to access a node on a bus;
    accepting the request if a bus identification portion of a destination address of the request matches a local bus identification address and a local node identification address of the destination address matches a physical node identification address on the local bus;
    translating a stable identification address of the destination address to a physical node identification address if the bus identification portion of the destination address matches a logical bus identification address or the bus identification portion of the destination address matches a bus number; and accepting the request if the translated physical node identification address matches a physical node identification address on the local bus.

19. A method of node identification comprising:

identifying a physical node identification address for a node; and storing the physical node identification address as a stable node identification address.

20. The method of claim 19 further comprising:

matching a local identification portion of a received destination address to the stable node identification address; and translating the stable node identification address to a physical node identification address.

21. A memory for storing data for access by a program being executed on a data processing system, comprising:

a data structure stored in a memory, the data structure including information used by a program including:

a virtual address data structure including software settable bus identification addresses for nodes on a net;

a physical address data structure including physically assigned node identification addresses for nodes on a local bus; and a logical address data structure including stable node identification addresses for nodes on the local bus.

* * * * *